United States Patent [19]
Denny

[11] 3,778,581
[45] Dec. 11, 1973

[54] TIME-AT-TEMPERATURE A-C REFLOW SOLDERING POWER SUPPLY

[75] Inventor: Bradley J. Denny, Vista, Calif.

[73] Assignee: Hughes Aircraft Company, Culver City, Calif.

[22] Filed: Aug. 3, 1972

[21] Appl. No.: 277,849

[52] U.S. Cl. .................................. 219/85, 219/110
[51] Int. Cl. ............................................. B23k 1/02
[58] Field of Search ..................... 219/85, 110, 111; 317/40

[56] References Cited
UNITED STATES PATENTS
| | | | |
|---|---|---|---|
| 3,564,293 | 2/1971 | Mungenast | 317/40 X |
| 3,263,057 | 7/1966 | Conti | 219/85 |
| 3,389,239 | 6/1968 | Treppa et al. | 219/110 |

Primary Examiner—C. L. Albritton
Attorney—W. H. MacAllister, Jr. et al.

[57] ABSTRACT

An improved a-c power supply for use in a reflow soldering system is disclosed. The output from a thermocouple attached to the heater bar is amplified and compared to a preset reference voltage. This controls the rate at which a-c current is fed to the heater and thus controls the heater temperature. A timing circuit synchronized to the line frequency is activated when the heater temperature reaches its preset value. A fail-safe shutdown circuit is provided to disable the output should one of the thermocouple leads break. Furthermore, should the heater not reach the desired temperature within a reasonable time, the power is turned off, thereby protecting the circuit elements in the event of a shorted heater or cabling to the heater.

3 Claims, 5 Drawing Figures

TIME-AT-TEMPERATURE A-C REFLOW SOLDERING POWER SUPPLY

SUBJECT MATTER OF THE INVENTION

The present invention relates to reflow soldering and more particularly to an a-c power supply for controlling the "time-at-temperature" of a reflow soldering heater bar.

BACKGROUND OF THE INVENTION

Reflow soldering is conventionally used to connect various electronic components to printed circuit boards. Obviously, it is desirable to apply heat to the leads and pads to be soldered in such a manner as to cause the solder to flow and at the same time maintain a temperature low enough that any semiconductors or other heat sensitive electronic components in the vicinity will not be damaged during the soldering operation. In automatic place and solder systems the reflow soldering operation must be as fast as possible; however, too much heat must be avoided. The soldering operation must be timed not only in order to ensure that a good solder join is made, but also to provide to the positioning system signals for holding and for changing positions.

Some prior art power supplies designed for use in reflow soldering systems do not control the heater temperature directly but only control the average power supplied to the heater and the time period during which it is supplied. Thus, it can be seen that the temperature actually reached by the heater bar would frequently be higher than that required to do the job and sometimes so high as to cause damage to the temperature sensitive parts being assembled. Such prior art power supplies required a sufficient time period between soldering operations to ensure that the heater has coasted back down to a predetermined ambient temperature. Another type of prior art power supply employed feedback to control the maximum temperature reached by the heater but only approximated the time-at-temperature specified by the operator because such prior art power supplies either did not detect the moment the heater bar reached the preset temperature, or else they were not capable of accurately controlling that temperature once it had been reached.

SUMMARY OF THE INVENTION

Accordingly, one object of the present invention is to provide an a-c power supply suitable for use with a reflow soldering apparatus wherein both temperature and time-at-temperature may be accurately controlled.

Another object of the present invention is to provide an a-c reflow soldering power supply with fail-safe features.

The invention which satisfies these and other objectives monitors the output voltage of a thermocouple connected to the heater bar. Comparison of the voltage (with respect to ground) of each thermocouple lead detects a failure in the thermocouple or its mounting. The thermocouple output voltage is simultaneously compared to a preset reference voltage (corresponding to the desired temperature) which controls the rate at which power is supplied via a triac and an output transformer to the heater bar.

A timing circuit is enabled as soon as the thermocouple output voltage reaches the preset level. After the appropriate time has elapsed, the trigger generator is turned off. A zero crossing detector actuated by the line frequency provides clock pulses to the circuit logic and sync pulses to the trigger generator.

Additional objects, advantages and characteristic features of the present invention will become readily apparent from the following detailed description of a preferred embodiment of the invention when considered in conjunction with the accompanying drawings in which.

Figure 2:
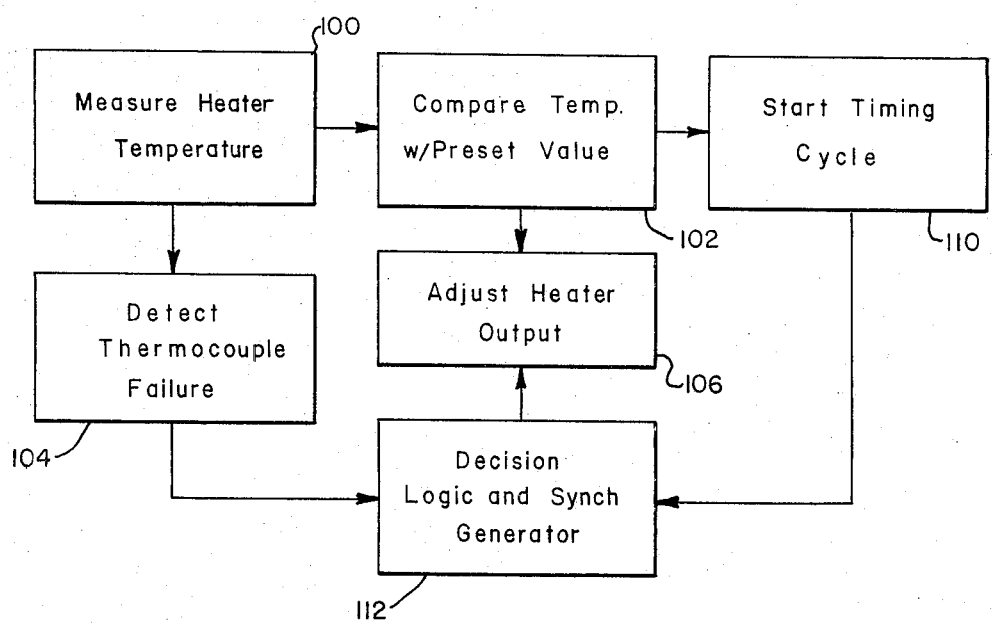
FIG. 2 is a power supply block diagram.
Figure 3:
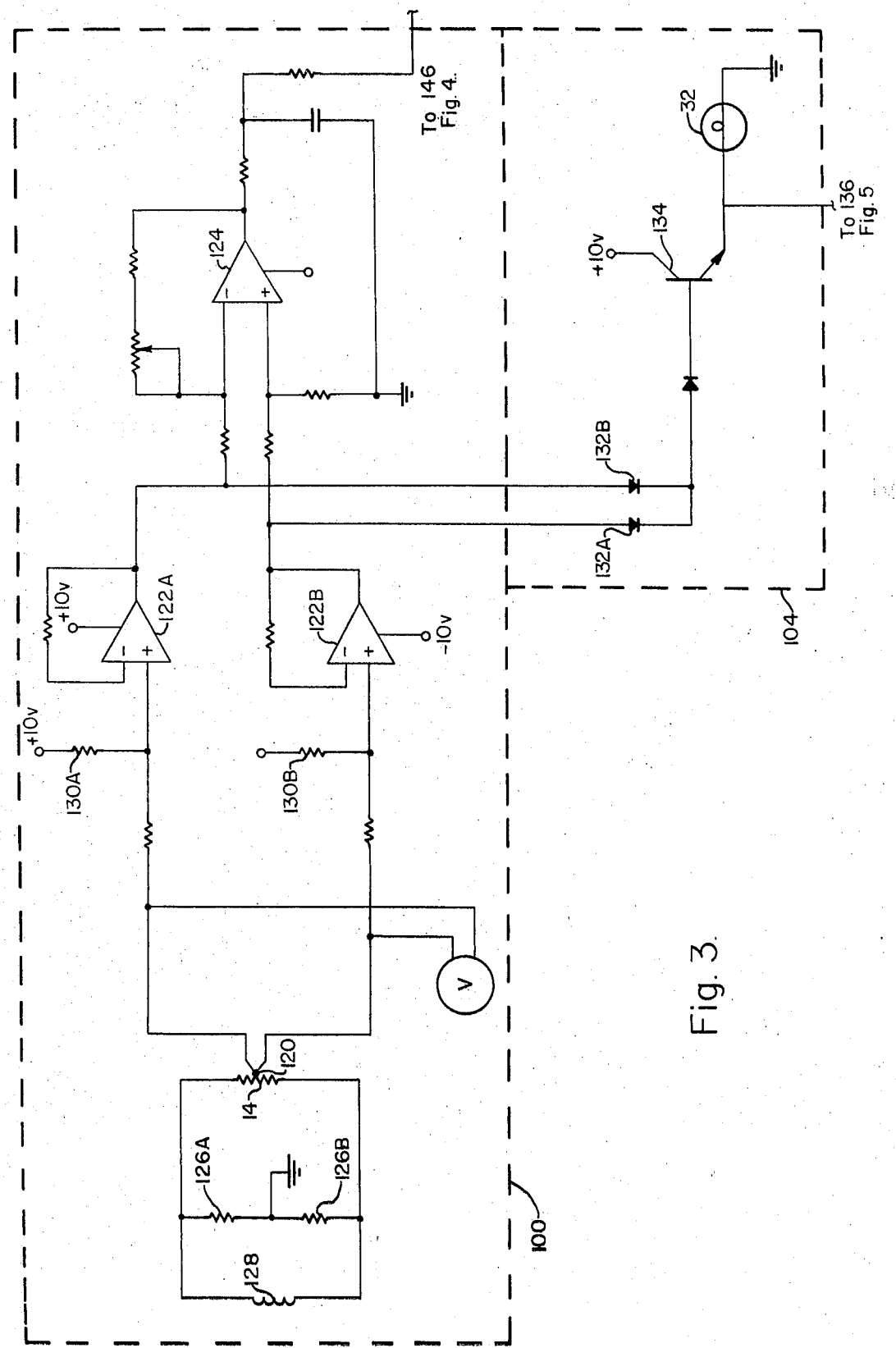
Figure 4:
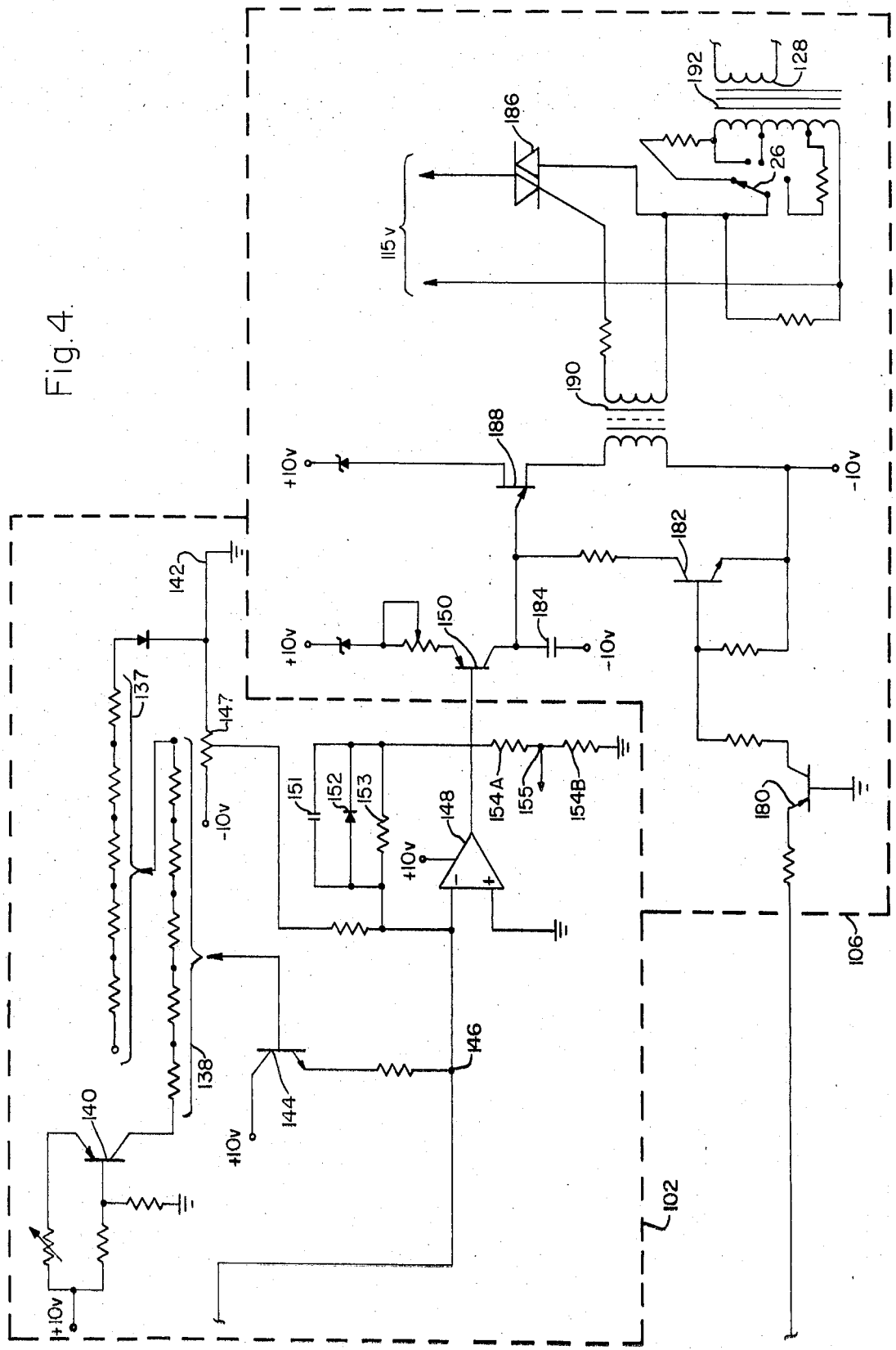
Figure 5:
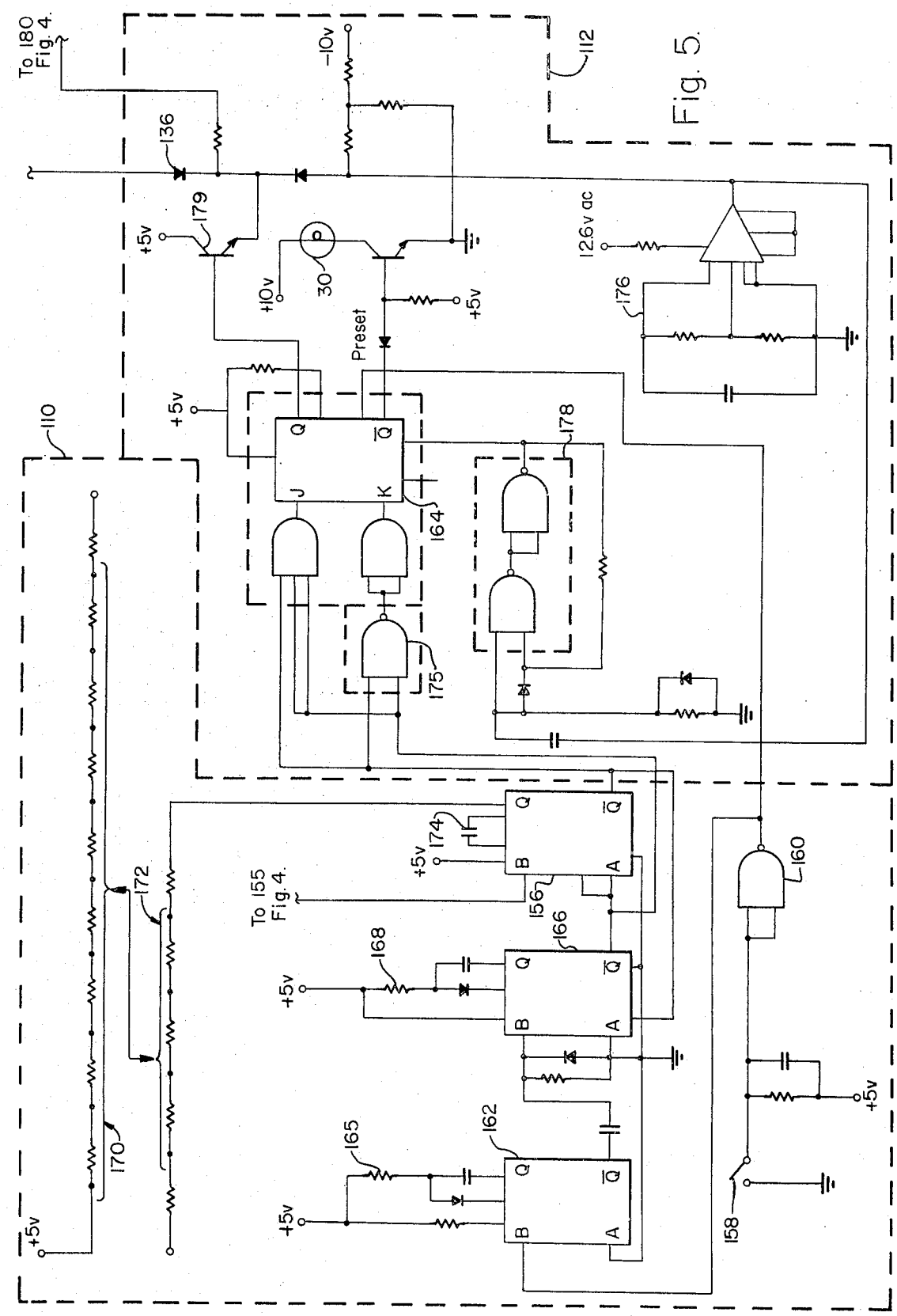

FIGS. 3, 4, and 5 are detailed circuit schematics of the blocks in FIG. 2.

DETAILED DESCRIPTION

Figure 1:
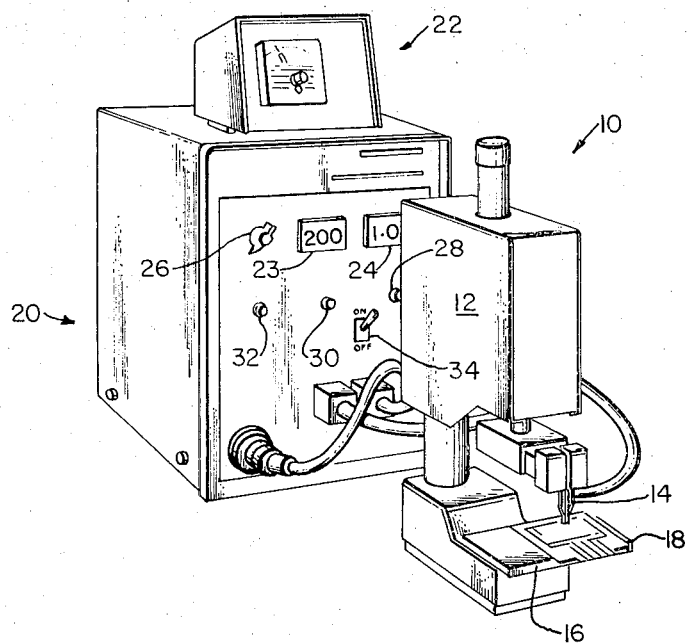
FIG. 1 illustrates a reflow soldering system utilizing the inventive power supply.

Referring now to FIG. 1, it may be seen that the reflow soldering system 10 includes a welding head 12 to which is attached a heater bar 14 and a platform 16 upon which the workpiece 18 may be disposed; as well as a power supply 20 and an optional temperature indicator 22.

Welding head 12 may be, for example, a Model VTA 67 manufactured by Hughes Aircraft Company, Industrial Products Division. The heater bar may be a Hughes MLS series Tantalum Heater Bar equipped with a Chromel/Constantan thermocouple welded to the heater bar. The temperature indicator 22 may be a Hughes Model MA-16-02B Temperature Calibrator which indicates the actual temperature of the heater bar by monitoring the thermocouple output voltage.

Power supply 20 includes a temperature setting thumb wheel 23 adjustable from 100° to 590°C, a "time-at-temperature" thumb wheel 24 adjustable from 0.1 second to 5.9 seconds, and a power range selector switch 26 for matching the peak power output to the size of the heater bar actually being used. The front panel of the power supply 20 also includes a yellow pilot lamp 28 to indicate "a-c on," a green pilot lamp 30 to indicate a heating cycle in progress, a red warning pilot lamp 32 to indicate a fault in the thermocouple circuitry and a power on-off switch 34.

Referring now to the block diagram of FIG. 2, it may be seen that the inventive power supply 20 comprises a temperature measuring portion 100, a temperature setting portion 102, a thermocouple fail-safe portion 104, an output regulating portion 106, a timing portion 110 and a logic portion 112. Not shown in FIG. 2 but also a part of power supply 20 is a conventional circuit for converting the a-c line voltage to regulated d-c voltage sources of +5 volts, +10 volts, −10 volts, in addition to a 12.6 volt a-c output. The structure and functional relationships of these various portions of the power supply may be better understood by reference to the detailed circuits of FIGS. 3, 4, and 5, which will now be described.

Within the measuring circuitry 100 (FIG. 3), it may be seen that the output of a Chromel/Constantan thermocouple 120 attached to heater bar 14 passes through a pair of operational amplifiers 122a and 122b from whence it is fed to a differential amplifier 124, the output of which is proportional to the heater bar thermocouple 120 output voltage, and consequently is proportional to the temperature of heater bar 14. It should be noted that thermocouple 120 is welded to heater bar 14; consequently, a portion of the thermocouple is grounded through a pair of equal valued resistors 126a and 126b which effectively provide a grounded center tap for the output transformers' secondary 128. Furthermore, each of the outputs from thermocouple 120 is biased to a positive voltage through a pair of relatively high resistances 130a and 130b so that if the thermocouple becomes physically and electrically detached from the heater bar 14, the inputs to operational amplifiers 122a and 122b (and therefore their outputs) will go high.

Within thermocouple fail-safe circuit 104 (also shown in FIG. 3), the aforementioned outputs of operational amplifiers 122a and 122b are respectively fed through a pair of diodes 132a and 132b to the base of a transistor switch 134. As noted previously, a failure in the welded connection between thermocouple 120 and the heater bar 14 will result in a high positive input to operational amplifiers 122a and/or 122b. This high input will be amplified and impressed on the base of transistor 134 through diodes 132a and/or 132b, thereby making transistor 134 conductive. In that case, the emitter of transistor 134 will be at approximately +10 volts (the voltage applied to the collector of transistor 134) which will cause pilot light 32 to light and will also cause a positive signal to be fed to the diode 136 of logic portion 112 (FIG. 5).

Referring now with greater particularly to FIG. 4, it may be seen that the circuitry of temperature setting portion 102 includes a pair of resistance networks 137 and 138. Dial 23 (FIG. 1) selects the point at which resistance networks 137 and 138, attached between the output of a current source 140 and ground 142, are tapped and thereby selects a heater bar temperature from 100° to 590°C. The voltage at this tapped point is amplified by transistor 144 and algebraically added to the output of op amp 124 at junction point 146. (The negative output from inverting operational amplifier 124 is effectively subtracted from the positive reference voltage output of transistor 144.) Junction 146 is a current summing point which is adjusted by OFFSET potentiometer 147 so that the output of inverting operational amplifier 148 is approximately +7 volts when the sum of positive reference voltage from transistor 144 and the amplified thermocouple voltage from operational amplifier 124 are algebraic 0. The action of inverting operational amplifier 148 and its feedback impedance (resistor 151 and capacitor 155) is to provide an output which will effect a virtual ground (0 voltage) at junction 146. Diode 152 clamps the output of operational amplifier 148 so that it may not go more negative than ground, protecting transistor 150, when the amplified thermocouple voltage is low (heater bar cold) and the positive reference voltage is high (high temperature selected). Thus when the thermocouple's amplified voltage matches the set reference voltage from the temperature dial, the output of temperature adjusting portion 102 is a voltage which may typically be +7 volts applied to the base of transistor 150 in triggered output portion 106. A somewhat lower voltage at junction point 155 in the center of the resistance bridge formed by resistors 154a and 154b is also applied to the "B" terminal of multivibrator 156 within timing circuitry 110 (FIG. 5). However, when the amplified voltage from thermocouple 120 does not match the set reference voltage at junction point 146, the inverted output of operational amplifier 148 goes to ground and consequently the base of transistor 150 as well as the "B" terminal of multivibrator 156 is grounded.

Referring now to FIG. 5 wherein timing circuit 110 and logic circuit 112 are illustrated, it may be seen that timing circuit includes an actuating switch 158 which is preferably integral with weld head 12 (FIG. 1) and actuated when the heater bar 14 is in pressure contact with workpiece 18 with a force equal to a preset threshold. The output of the switch 158 is inverted by an inverter 160 so that when the switch is closed or in its "fire" position, a positive voltage is applied both to the B input of a "de-bounce" multivibrator 162 and to the preset input of J-K flip-flop 164 within logic portion 112. Monostable multivibrator 162 has external timing circuitry 165 connected to it, such that it has a time constant of approximately 10 milliseconds. The purpose of this multivibrator is to enable the subsequent logic circuitry only after there are no further transients output from inverter 160 as a result of the "bouncing" of the contacts of switch 158. At the end of the 10 milliseconds, multivibrator 162 ceases to fire and output $\overline{Q}$ goes high, thereby activating multivibrator 166 within the timing circuitry portion 110.

Timing portion 110 also includes a second multivibrator 166 and a third multivibrator 156. As noted previously, after multivibrator 162 has completed its 10 millisecond cycle, multivibrator 166 is activated. External timing network 168 results in a time constant of approximately 2 seconds and is provided in order to allow the heater bar to be heated to the preset temperature and to terminate the heating cycle if the preset heater temperature is not reached within a reasonable time. During the 2 seconds, multivibrator 156 is enabled but does not fire until the voltage at junction 146 within the temperature setting circuitry 102 (FIG. 4) goes to ground which, as noted previously, means that the preset heater temperature has been attained. Also connected to multivibrator 156 are a pair of adjustable resistance networks 170 and 172 (controlled by dial 24 (FIG. 1)), connected in series between a positive voltage supply of +5 volts and the external timing terminals of multivibrator 156. This adjustable resistance network, in conjunction with timing capacitor 174, effectively controls the time during which multivibrator 156 is firing, and thus, the "time-at-temperature" of the heater bar.

The outputs of timing circuitry multivibrators 166 and 156 go to a J-K flip-flop 164 within logic portion 112. These outputs are directly connected to the J terminal and pass through an inverter 175 before they are applied to the K terminal. Also connected to J-K flip-flop 164 is a clock signal which is generated by a zero crossing detector 176 triggered by a 12.6 volt a-c input and shaped by an amplifier circuit 178. A line from the aforementioned inverter 160 clears the J-K flip-flop when actuator switch 158 is opened. The Q output of the J-K flip-flop 164 is amplified by transistor 179 prior to being applied to the emitter of transistor 180 within trigger output circuit 106 (FIG. 4), while the $\overline{Q}$ output of the flip-flop 164 is connected to "heat on" indicator lamp 30.

Referring back to FIG. 4, triggered output regulating circuitry 106 will now be described. The three inputs to the emitter of transistor 180 are (1) a positive failsafe signal from the emitter of transistor 134 (FIG. 3) when the thermocouple loop is opened, (2) a positive signal from zero crossing detector circuitry 176 (FIG. 5) (twice per line voltage cycle), and (3) the output from transistor 179 of logic circuitry 112 (FIG. 5), which goes positive when the preset heating cycle time has been exceeded. Transistor 180 controls a switch transistor 182 which, when conductive, shorts capacitor 184 to ground and thus, as will be explained hereinafter, prevents any triggering of the triac 186 and consequently no output through the output transformer 192. The other input to the triggered output circuitry 106 is the output of operational amplifier 148 of temperature setting circuit 102. As was explained previously, this output, which is connected to the base of transistor 150, is a function of the difference between the acutal heater temperature and the preset temperature as determined by the setting of dial 23. When these two temperatures match, the base voltage of transistor 150 is approximately 7 volts and the current flowing through the transistor to charge timing capacitor 184 is at a minimum, such that the timing capacitor 184 can only charge to −4 volts before the sync pulse occurs and the capacitor is grounded as described previously. − 4 volts is not sufficient to fire the unijunction transistor 188; consequently, no trigger pulse is coupled to triac 186 via coupling transformer 190. If, however, the actual heater temperature is less than the desired temperature, then the base of transistor 150 will be near ground potential and a maximum current is provided to charge timing capacitor 184 whenever transistor switch 182 is "off." In this situation, timing capacitor 184 reaches the firing potential of unijunction transistor 188 (approximately −2 volts) in about 1 millisecond, transistor 188 then becomes conductive, discharging the potential present across capacitor 184 through the primary of transformer 190 and a pulse is applied to the triac 186 gate, turning it on for the remainder of that half cycle of line voltage which in turn furnishes power to the primary of transformer 192 for that half cycle. When timing capacitor 184 is discharged to the point where the unijunction transistor 188 is reversed biased (approximately −9 volts), transistor 188 becomes nonconductive and the capacitor again charges to −2 volts, at which point the cycle continues to be repeated until the line voltage crosses zero volts and therefore a sync pulse appears at the emitter of transistor 180, thereby closing transistor switch 182 and discharging timing capacitor 184 in preparation for the next line voltage half cycle. Any number of trigger pulses may be applied to triac 186 gate but it conducts on the first and turns off at the zero crossing of line voltage.

As the heater bar heats up due to the power delivered to it through the secondary 128 of output transformer 192 (shown in detail in the measuring circuitry 100 of FIG. 3), the amplified thermocouple voltage increases and the resulting increased voltage from operational amplifier 148 applied to the base of transistor 150 reduces the current through transistor 150 available to charge timing capacitor 184. Thus, instead of reaching the firing potential of transistor 188 in 1 millisecond, timing capacitor 184 takes several milliseconds. This increase in charging time means the triac 186 is conducting during a reduced portion of the line voltage half cycle and therefore a lesser amount of power is delivered to heater bar 14. After a number of half cycles, it may be seen that an equilibrium will be reached in which just enough current is supplied to timing capacitor 184 to allow just enough power be supplied to heater 14 to maintain the preset temperature. As noted previously, when the logic circuitry 112 (FIG. 5) has determined the end of the reflow cycle, based upon the maintenance of the desired heater temperature for the desired amount of time, transistor switch 182 is turned on and capacitor 184 can no longer charge. Furthermore, should fail-safe circuitry 104 (FIG. 3) detect a failure in the thermocouple, transistor 180 and therefore transistor switch 182 turn on, thereby discharging capacitor 184 and preventing further triggers to the triac 186. If this fail-safe occurs after triac 186 has been triggered, it will continue to be conductive for the remainder of the present half cycle but will not fire on any successive half cycles. In this manner, the heater bar is protected from damage caused by inadvertent overheating caused by poor thermocouple connections, pilot lamp 32 providing a visual indication of the situation to the operator.

What is claimed is:

1. In a reflow soldering system, the combination comprising:
    a heater bar;
    a thermocouple attached to said heater bar;
    reference means for providing a reference output corresponding to a desired heater bar temperature;
    comparison means for comparing the output from said thermocouple with said reference ouput;
    regulating means responsive to said comparison means for controlling the rate at which current is supplied to the heater bar;
    timing means responsive to said comparison means for controlling the length of time during which current is supplied to said heater bar;
    detection means for detecting a failure in said thermocouple; and
    disabling means responsive to said detection means for disabling the supply of current to said heater bar upon detection of a thermocouple failure.

2. In a reflow soldering system, the combination comprising:
    a heater bar;
    a thermocouple attached to said heater bar;
    reference means for providing a reference output corresponding to a desired heater bar temperature;
    comparison means for comparing the output from said thermocouple with said reference output;
    regulating means responsive to said comparison means for controlling the rate at which current is supplied to said heater bar;
    timing means responsive to said comparison means for controlling the length of time during which current is supplied to said heater bar; and
    disabling means for disabling the supply of current to said heater bar in response to the failure of said thermocouple output to attain a preset value within a preset period of time.

3. In an a-c power supply for use in a reflow soldering system having a heater bar maintained at a potential close to ground, a thermocouple mechanically and electrically connected to said heater bar, and a welding head:
    means for preselecting heater bar temperature;
    means for preselecting "time-at-temperature;"
    means for preselecting a power range appropriate to the size of the heater bar in use; and
    means for indicating normal and abnormal operation of said system including means for detecting a failure in said connection between said thermocouple and said heater bar evidenced by the output of said thermocouple assuming a potential essentially equal to that of a bias potential connected to said thermocouple output via a bias resistor.

* * * * *